United States Patent
Kajimoto et al.

[11] Patent Number: 5,999,161
[45] Date of Patent: Dec. 7, 1999

[54] APPARATUS AND METHOD FOR EXTRACTING A PORTION OF AN IMAGE

[75] Inventors: Masato Kajimoto, Chiba; Hirofumi Murase, Kanagawa, both of Japan

[73] Assignee: Sony Corporation, Tokyo, Japan

[21] Appl. No.: 08/685,518

[22] Filed: Jul. 24, 1996

[30] Foreign Application Priority Data

Jul. 28, 1995 [JP] Japan ................................. 7-212686

[51] Int. Cl.⁶ .................................................. G09G 5/00
[52] U.S. Cl. .......................... 345/131; 345/507; 382/232
[58] Field of Search ........................ 345/127, 129–131, 345/132, 203, 515, 516, 118, 507–508; 382/198, 232–233, 300, 199; 358/451, 470, 530; 395/200.77, 114; 348/403

[56] References Cited

U.S. PATENT DOCUMENTS

| | | | |
|---|---|---|---|
| 4,288,816 | 9/1981 | Kashioka et al. | 382/232 |
| 5,047,868 | 9/1991 | Takeda et al. | 386/109 |
| 5,165,103 | 11/1992 | Takeda et al. | 382/305 |
| 5,329,616 | 7/1994 | Silverbrook | 345/508 |
| 5,513,301 | 4/1996 | Wakasu | 345/114 |
| 5,801,776 | 9/1998 | Tamura et al. | 348/403 |
| 5,826,035 | 10/1998 | Hamada et al. | 395/200.77 |

FOREIGN PATENT DOCUMENTS

| | | |
|---|---|---|
| 0 473 340 | 3/1992 | European Pat. Off. . |
| 40 02 179 | 8/1990 | Germany . |

*Primary Examiner*—Richard A. Hjerpe
*Assistant Examiner*—Francis Nguyen
*Attorney, Agent, or Firm*—Frommer Lawrence & Haug, LLP.; William S. Frommer; Dennis M. Smid

[57] ABSTRACT

An apparatus and method for extracting a desired portion of an image represented by compressed data. The compressed data is expanded in an expanding circuit and outputted therefrom in accordance with clock pulses. Such clock pulses, or data transfers or addresses associated therewith, are counted so as to determine the position of the data. The determined position of the data is compared to the desired portion so as to determine whether the data is within the desired portion. If the data is determined to be within the desired portion, such data is stored in an image memory. As a result, such extraction may be performed without utilizing an additional memory for temporarily storing the expanded data.

12 Claims, 7 Drawing Sheets

APPARATUS AND METHOD FOR EXTRACTING A PORTION OF AN IMAGE

BACKGROUND OF THE INVENTION

The present invention relates to a video processing apparatus and method and, more particularly, to such apparatus and method for use with an electronic still camera for recording and/or reproducing still image digital video signals in a compressed form onto and/or from a recording medium such as an optical disk, a magneto-optical disk or a semiconductor memory.

In a digital recording and/or reproducing type electronic still camera, an image of an object may be supplied through a photographing or charge coupled device (CCD) so as to obtain a video signal. Such video signal may be converted to digital form and compressed in accordance with an image compression technique of the Joint Photographic Experts Group (JPEG) which may utilize a discrete cosine transform (DCT) and variable-length coding. As a result of such JPEG technique, colored still image data may be compressed with a relatively high compression ratio, such as 1 to 1/100. The digital compressed video signal may thereafter be recorded on a recording medium, such as a magneto-optical disk.

The above-described electronic still camera which records data in a digital form onto a magneto-optical disk has numerous advantages. For example, a relatively large number of still image data may be recorded on one disk, the quality of the recorded images may remain substantially high and may not substantially deteriorate over time, compilation of data is relatively easy, and still image data may be copied into a computer. Furthermore, such use is believed to increase in the future.

A user or operator of the digital type electronic still cameras may wish to extract and display only a part of an original image. Additionally, the user may wish to enlarge or reduce a part of an original image, modify it, move or rotate it and so forth. To perform these latter functions, such part of the original image is extracted. Moreover, a part of an original image may be extracted in numerous other situations. For example, consider the situation wherein an original image is read or introduced through a scanner. In such situation, the image may be larger than a display plane and, as such, a part of the original image is cut so as to display the original image in the display plane. However, to perform such extraction of a part of an original image may necessitate processing of the image data and the use of multiple memories as hereinbelow described.

More specifically, since digital type electronic still cameras may record/reproduce still image data which is compressed in accordance with a JPEG technique, a desired area of an original image to be extracted or cut out may not be designated directly from the JPEG-compressed data. Instead, the desired area is designated or extracted from the original image in a non-compressed form. Accordingly, to extract a desired area from JPEG-compressed data, the original image is reconstructed from the JPEG-compressed data and processing pertaining to the extraction of the designated area is performed. That is, all of the data of a field of the JPEG-compressed data is expanded into the original image data, the expanded data (original image) is stored in a memory, a corresponding area on memory is designated, the desired part of the original image is cut out or extracted, and such part is stored in an image memory.

An example of the above extraction procedure is illustrated in FIGS. 9A–9D. That is, as shown in FIG. 9A, JPEG-compressed data is expanded so as to form an original image which is stored in a memory. A read address corresponding to a region A1 is designated from the original image in the memory, and the image of the region A1 is read out. The data in the region A1 is written in an image memory as shown in FIG. 9B. Upon performing a data interpolation or thinning operation or the like, an enlarged or reduced image may be formed as respectively illustrated in FIGS. 9C and 9D and written into the image memory.

The above-described technique, which expands JPEG-compressed data into original image data, stores it in a memory, cuts out a desired part of the original image in a designated area of the memory, and stores it in an image memory, utilizes an additional memory for temporarily storing the original image data expanded from the JPEG-compressed data. As a result, the number of components in a circuit utilized to perform such technique, and/or the complexity thereof, and/or cost thereof may be relatively high.

OBJECTS AND SUMMARY OF THE INVENTION

An object of the present invention is to provide a technique for extracting or cutting out a desired portion of an original image represented by compressed data without using an additional memory for storing image data expanded from the compression data.

In accordance with an aspect of the present invention, a video apparatus is provided which comprises an image expanding device for expanding compressed image data; an image memory for storing expanded image data; a counter for counting a number of expanded image data transfers from the image expanding device; a position computing device responsive to an output of the counter for determining positions of the image data from the image expanding device; a device for designating a part of the image data for display; a device for comparing a respective position of the image data from the image expanding device with positions of image data within the part of the image data designated for display; and a memory control device responsive to an output of the comparing device for controlling the image memory.

In accordance with another aspect of the present invention, a video memory controller is provided for controlling a video memory so as to extract a part of an original picture. The controller comprises a device for dividing a compressed picture into a plurality of blocks; a device for expanding each block to an original picture; a counting device for counting each block address of the plurality of blocks; a selecting device for selecting the part of the picture to be extracted; a comparison device for comparing the address from the counting device and the address corresponding to the part selected by the selecting device; and a controlling device for controlling a write operation of the video memory in accordance with the result of the comparison device.

Thus, in accordance with the present invention, to extract a portion of an original image expressed in a compressed form, the compressed image data is expanded. A current or respective position (or address) of the original image may be calculated from a counted number of expanded data (or addresses) to determine whether the respective position (address) of the original image is in the portion of the image to be extracted. When such determination indicates that the respective position (address) of the original image is in the portion of the image to be extracted, the respective data is stored in an image memory. Therefore, no additional memory other than the image memory is utilized to extract a part of an original image.

Other objects, features and advantages according to the present invention will become apparent from the following detailed description of illustrated embodiment when read in conjunction with the accompanying drawings in which corresponding components are identified by the same reference numerals.

DETAILED DESCRIPTION OF THE PREFERRED EMBODIMENT

The preferred embodiment of the present invention will now be described with reference to the accompanying drawings.

The present invention, which may be utilized with an electronic still camera, enables a desired part from JPEG-compressed data or the like to be extracted and stored in an image memory without using additional memories. This feature of the present invention is initially described below after which a description of the present apparatus will be provided.

Figure 1:
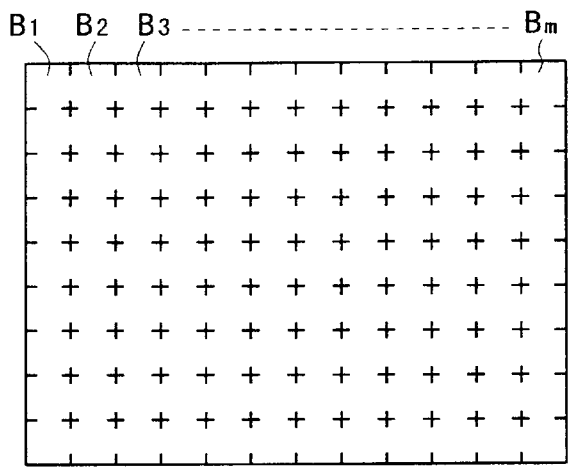
FIG. 1 is a diagram of an image plane having a plurality of blocks to which reference will be made in explaining an embodiment of the present invention.
Figure 2:
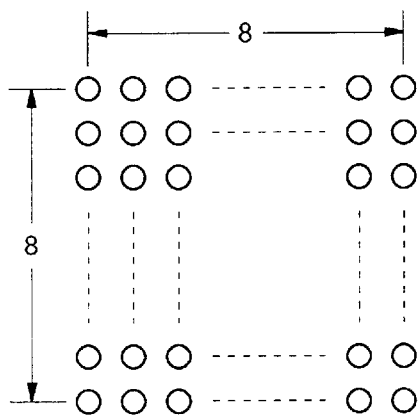
FIG. 2 is a diagram of a block to which reference will be made in explaining an embodiment of the present invention.

The image data recorded or reproduced by the present electronic still camera may be compressed in accordance with a predetermined technique, such as a JPEG technique. Such JPEG technique may divide each image plane into a plurality of blocks as, for example, shown in FIG. 1. Each of these blocks may comprise a number of pixels, such as (8×8) as shown in FIG. 2. The JPEG technique may convert time-domain data into frequency-domain data for each block by using a discrete cosine transform (DCT) and may quantize and encode the DCT-converted data by a variable-length coding technique.

The JPEG-compressed data may be expanded by an expansion circuit. The expanded data for each block of 8×8 pixels may be outputted from the expansion circuit in accordance with a clock pulse. That is, the data of one pixel may be outputted with one clock pulse. As a result, it would take 64 clock pulses to output the expanded data of one (8×8=64 pixels) block.

Therefore, positions on the original image may be calculated or obtained by counting the number of clock pulses utilized for outputting data from the JPEG expanding circuit. Further, knowing the size of the original image may enable positions of the original image to be calculated or expressed in terms of such size. A desired portion of the original image may be located by such counting of clock pulses, whereupon the desired part may be extracted.

Figure 3:
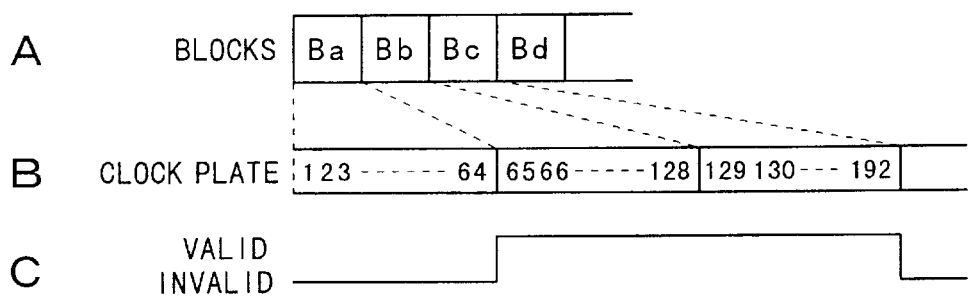
FIGS. 3A–3C are diagrams to which reference will be made in explaining the extraction of data according to an embodiment of the present invention.

As an example, assume that a user wishes to extract the data of blocks Bb and Bc from among blocks Ba, Bb, Bc, . . . which are aligned in a horizontal direction of an original image, as shown in FIG. 3A. As shown in FIG. 3B, 64 clocks are necessary for outputting the data of each of the blocks Ba, Bb and Bc. Therefore, by counting clock pulses the data from the 65th clock pulse to the 192th (64×3=192) clock pulse may be determined or located and such data may be considered as valid data, as shown in FIG. 3C. Upon locating the desired blocks Bb and Bc, such desired data may be extracted.

Figure 4:
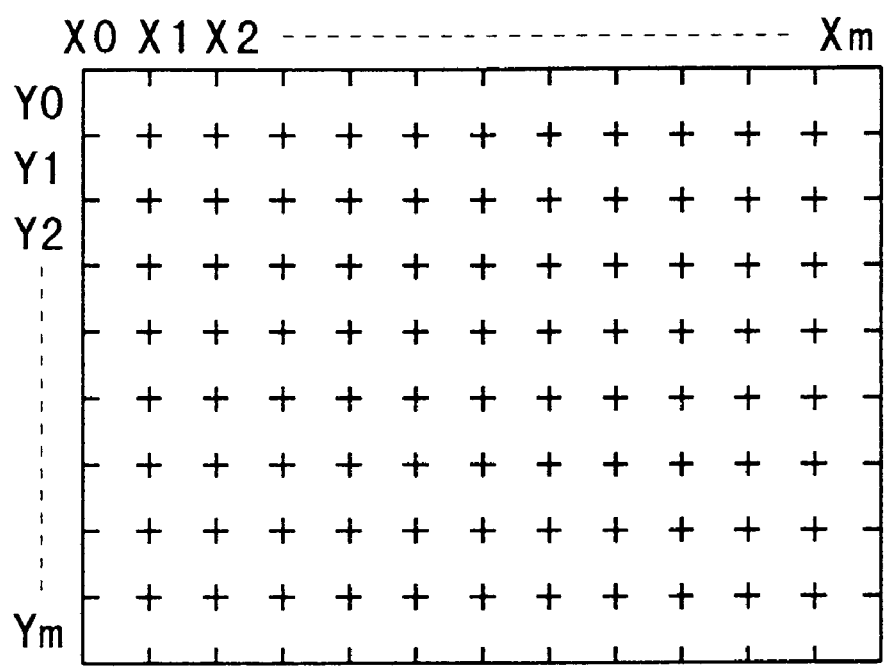
FIG. 4 is a diagram of a block to which reference will be made in explaining the extraction of data according an embodiment of the present invention.

More specifically, the location of the horizontal position to be extracted may be determined by dividing the count value of clock pulses associated with the output data by 64. That is, as shown in FIG. 4 wherein horizontal regions X0, X1, X2, . . . Xm. correspond to individual blocks and appear at intervals of 8, the integer part of a value obtained by dividing the clock pulse count value of the output data in the horizontal region X0 by 64 is 0, the integer part of the value obtained by dividing the clock pulse count value of the output data in the horizontal region X1 by 64 is 1, the integer part of the value obtained by dividing the clock pulse count value of the output data in the horizontal region X2 by 64 is 2, and so forth. Thus, by sequentially dividing clock pulse count values of output data by 64, the horizontal positions X0, X1, X2 . . . may be determined from the integer parts of the values resulting from such division. Vertical positions within each region may be determined from the values of the remainders obtained by dividing clock pulse count values of the output data by 64.

Further, with regard to the vertical direction, the position of a desired part of the image may be identified or determined by counting the number of clock pulses associated with the data and by knowing the size of the original image such position may be expressed in terms of such size in a manner similar to that previously described. That is, if the number of blocks in the respective direction of the original image is n, the clock count value at the end of the n blocks is 64n. Therefore, by sequentially dividing clock pulse count values of the output data by 64n, regions Y0, Y1, Y2, . . . Ym of vertical blocks may be determined.

Accordingly, the position of an area to be extracted from an original image may be determined from clock pulse count values associated with the output data. As hereinafter more fully described, the extracted data of the original image may be stored in an image memory. Alternatively, addresses of the image memory may similarly be determined from count values of valid data.

Figure 6:
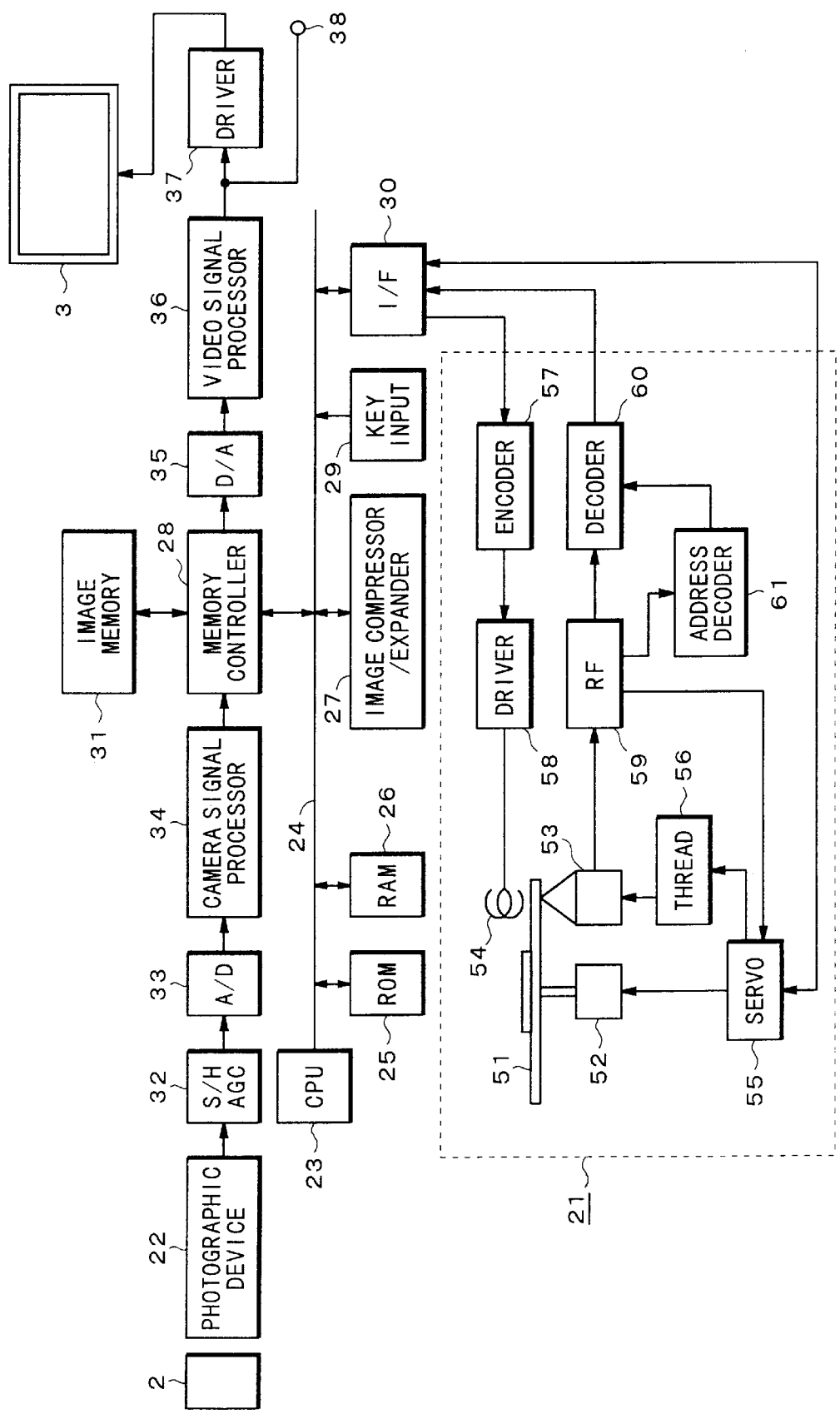
FIG. 6 is a diagram of the electronic still camera of FIGS. 5A and 5B.
Figure 7:
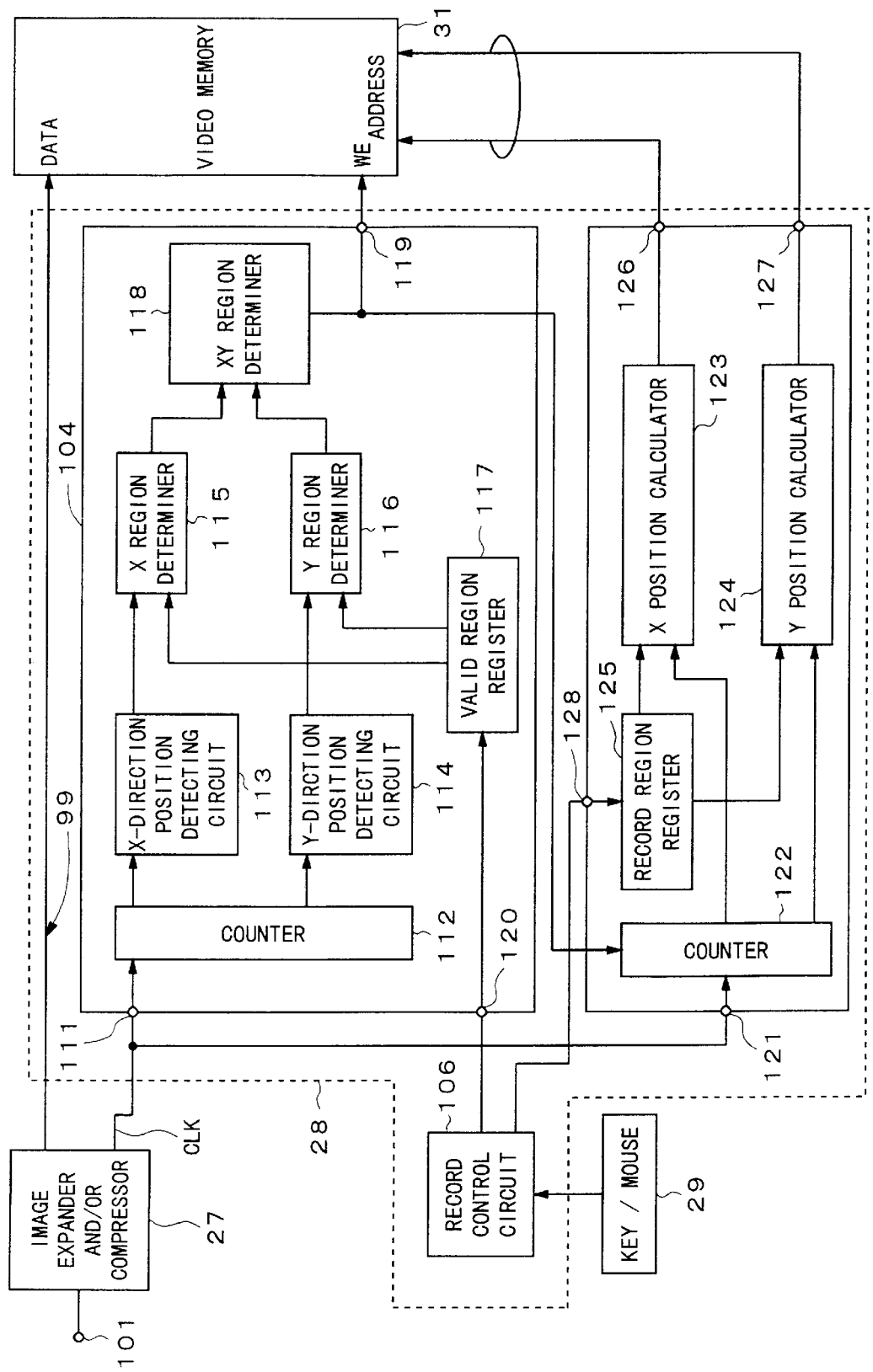
FIG. 7 is a diagram of a portion of the diagram of FIG. 6.

An apparatus for determining the position of a desired part of an original image to be extracted by utilizing clock pulse count values of output data and for storing the resulting data in an image memory is illustrated in FIG. 7. Such apparatus may be utilized with an electronic still camera as illustrated in FIG. 6 and as hereinafter more fully described. Furthermore, other than the image memory, this apparatus does not utilize an additional memory for temporarily storing image data expanded from compressed data when performing such extraction operation.

The apparatus of FIG. 7 includes a JPEG image expansion and/or compression circuit 27, a memory controller 28, an input device 29 and a video or image memory 31 which are coupled together as shown. The memory controller generally includes a signal generating circuit 104, an address generating circuit 105 and a control circuit 106.

JPEG-compressed data may be supplied through an input terminal 101 to the JPEG expansion circuit 27 wherein the received data is expanded. The expanded video data for each (8×8) block may be supplied to the image memory 31 by way of a line 99 for storage therein. Clock pulses, which may be utilized by the JPEG expansion circuit 27 for the image data, may be supplied to the write operation valid or invalid signal generating circuit 104 and the address generating circuit 105 which are controlled by the record control circuit 106.

The write operation valid or invalid signal generating circuit 104 generally includes a counter 112, an X-position detecting circuit 113, a Y-position detecting circuit 114, an X-region determining circuit 115, a Y-region determining circuit 116, a valid area register 117 and an X-Y-region determining circuit 118, which may be coupled together as shown in FIG. 7. The write operation valid or invalid signal generating circuit 104 is adapted to locate or detect the position of a desired part of an original image to be extracted in accordance with addresses which are counted values of clock pulses of the output data and to supply a valid or invalid signal to the image memory 31. The write operation valid or invalid signal generating circuit 104 is further adapted to supply counted data to the address generating circuit 105.

The clock pulses from the JPEG expansion circuit 27 may be supplied through an input terminal 111 to the counter 112 so as to be counted thereat. The counted value from the counter 112 is supplied to the X-position detecting circuit 113 and the Y-position detecting circuit 114. The X-position detecting circuit 113 is adapted to determine or specify the position of the output image data in the X-direction from the counted value from the counter 112. Alternatively, the X-position detecting circuit 113 may determine information indicative of such X position. Similarly, the Y-position detecting circuit 114 is adapted to determine or specify the position of the output image data in the Y-direction from the counted value from the counter 112. Alternatively, the Y-position detecting circuit 114 may determine information indicative of such Y position. An output of the X-position detecting circuit 113 (which may be a counted value of X coordinates) is supplied to the X-region determining circuit 115, and an output of the Y-position detecting circuit 114 (which may be a counted value of Y coordinates) is supplied to the Y-region determining circuit 116. Addresses, or range of addresses, corresponding to the part of the original image to be extracted in the X-direction and the Y-direction are respectively supplied to the X-region determining circuit 115 and the Y-region determining circuit 116 from the valid area register 117. The X-region determining circuit 115 is adapted to determine whether the X-directional position of the respective image data calculated by the X-position detecting circuit 113 is within the area to be extracted as defined by the X-directional addresses from the valid region register 117. Similarly, the Y-region determining circuit 116 is adapted to determine whether the Y-directional position of the respective image data calculated by the Y-position detecting circuit 114 is within the area to be extracted as defined by the Y-directional addresses from the valid area register 117. The X and Y region determining circuits may make such determinations by comparing the received signals to each other. For example, the X-region determining circuit 115 may compare the counted value of X coordinates from the X-position detecting circuit 113 and the address data in the X direction from the valid area register 117. The X-region determining circuit 115 and the Y-region determining circuit 116 may generate respective output signals, which may be enable or non-enable signals formed in accordance with the comparison results, and may supply such output signals to the XY-region determining circuit 118. The XY-region determining circuit 118 is adapted to receive the output (enable/non-enable) signals from the X-region determining circuit 115 and the Y-region determining circuit 116 and, in accordance therewith, to determine whether the XY-directional position of the respective image data is within the area or part of the original image to be extracted. An output of the XY-region determining circuit 118 may be supplied through an output terminal 119 to the image memory 31 as a write enable or a valid or invalid signal. For example, if the output signals from the X and Y region determining circuits 115 and 116 are both enable signals, the XY-region determining circuit 118 may supply a write enable signal to the image memory 31.

A user may designate the area to be extracted from the original image by use of the input device 29. Such input device may be a keyboard or a mouse which is coupled to a computer. The designated area information from the input device 29 is supplied to the record control circuit 105 which, in turn, determines the X and Y directional addresses therefrom and supplies the same to the valid area register 117.

The address generating circuit 105 generally includes a counter 122, an X-position computing circuit 123, a Y-position computing circuit 124 and a storage area register 125 which may be coupled together as shown in FIG. 7. The address generating circuit 105 is adapted to form or designate a write address based on a count value of clock pulses of valid data under the control of the record control circuit 106 and to supply the address signal to the image memory 31. Data pertaining to the extracted part of the original data may be written into the image memory 31 in accordance with the address from the address generating circuit 105.

The counter 122 of the address generating circuit 105 may receive the clock pulses of valid data from the JPEG expansion circuit 27 by way of an input terminal 121 and the output of the XY-region determining circuit 118. The counter 122 is adapted to count the received pulses and to supply a counted value signal to the X-position computing circuit 123 and the Y-position computing circuit 124. The X-position computing circuit 123 and the Y-position computing circuit 124 may further respectively receive an X-directional start address and a Y-directional start address from the storage area register 125. Such X and Y directional start addresses, which may be stored in the image memory, may be formed in (or based upon information from) the record control circuit 106 in accordance with an input from the input device 29. The X-position computing circuit 123 and the Y-position computing circuit 124 are respectively adapted to calculate or produce the X and Y directional addresses from the received signals and to supply the same to the image memory 31 by way of output terminals 126 and 127. As an example, the X-position computing circuit 123 may shift the horizontal address forward for the X-directional start address and the Y-position computing circuit 124 may shift the vertical address forward for the Y-directional start address. As a result, the scale or size of an image may be enlarged or reduced by changing the incrementing rate of the counter 122.

Figure 8:
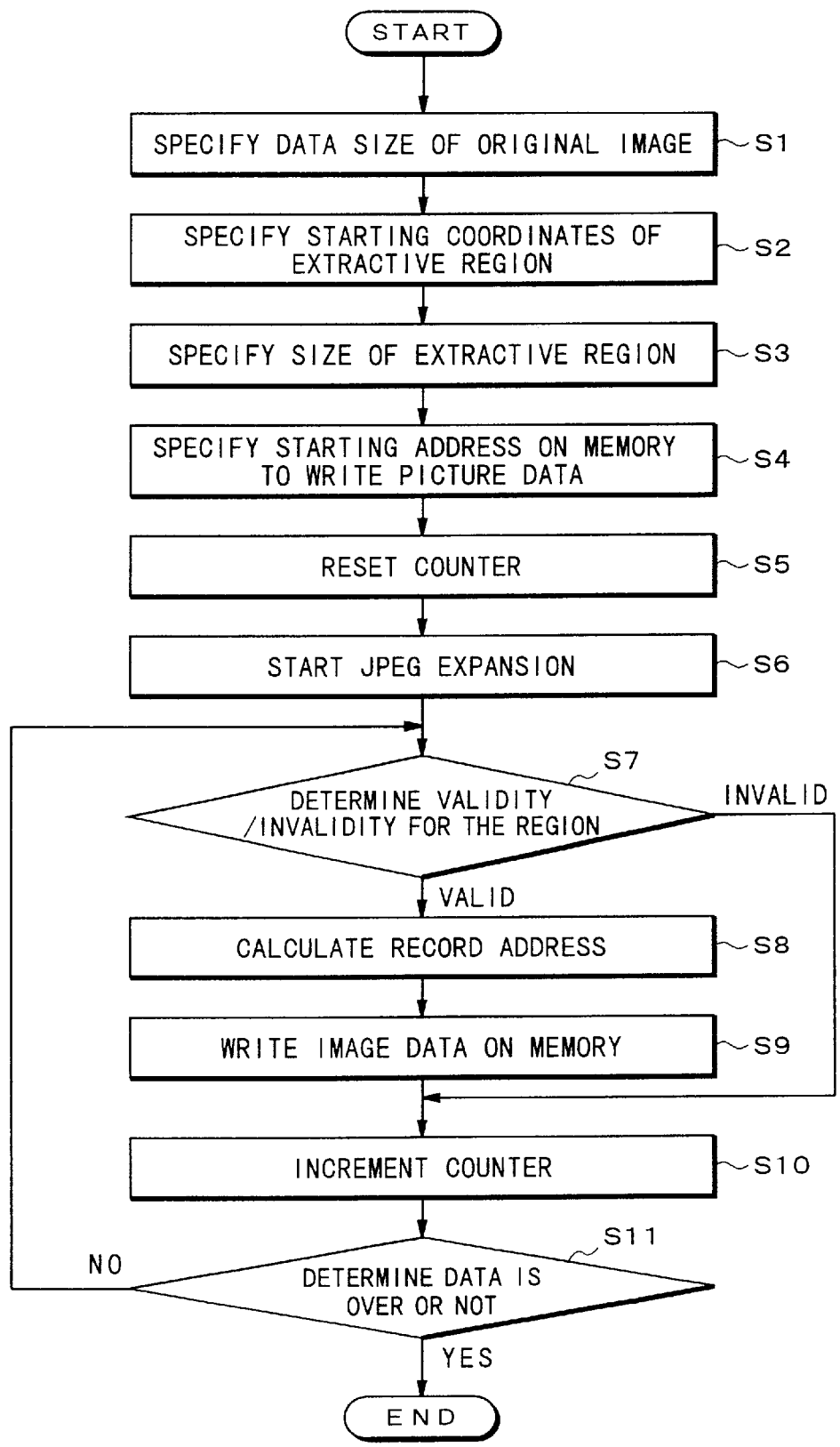
FIG. 8 is a flow chart to which reference will be made in explaining an operation of the electronic still camera of FIGS. 5A and 5B.
Figure 9A:
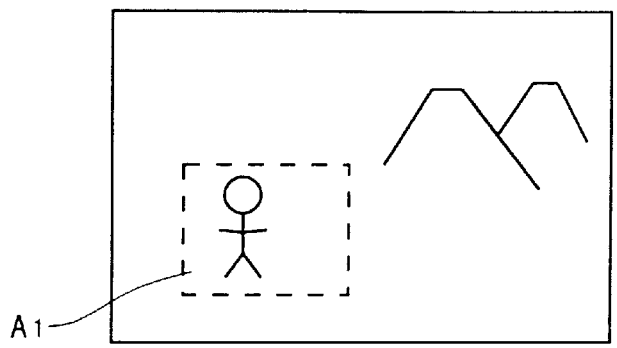
FIGS. 9A–9D are diagrams to which reference will be made in explaining extraction of a part of an image in the Background of the Invention.
Figure 9B:
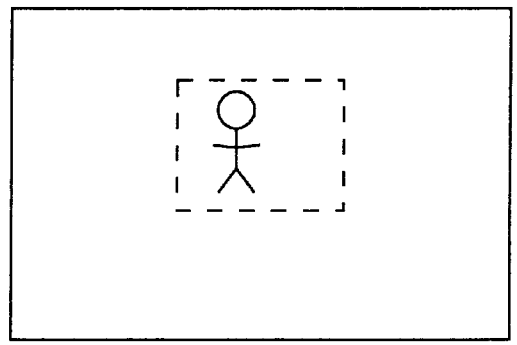
Figure 9C:
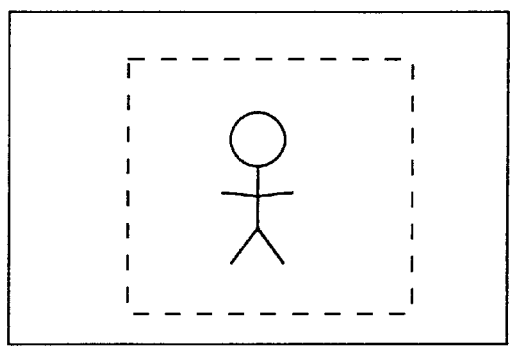
Figure 9D:
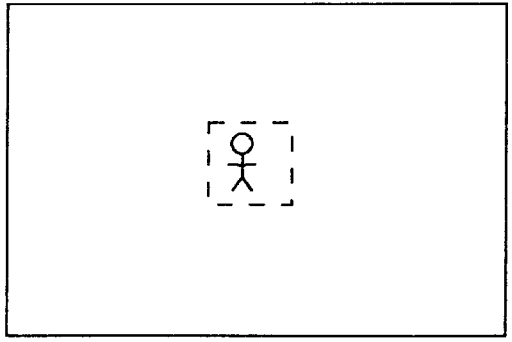

An operating procedure for determining positions for an extraction operation by counting the number of clock pulses or data in the expanded form will now be described with reference to the flow chart of FIG. 8.

In step S1, the data size of the original data is detected or determined. Coordinates of the start point of a desired part of the original image to be extracted are determined in step S2, the size of such desired part is determined in step S3, and the starting address for the memory is determined in step S4. Afterwards, the counter for counting the number of clock pulses or data is reset in step S5, and the image compression/expansion circuit 27 executes a JPEG expansion procedure in step S6.

Processing then proceeds to step S7 wherein the position of a current or respective data of the original image is determined by counting the number of clock pulses or data in the expanded form and a determination is made as to whether such position is within the part of the image to be extracted. In other words, such determination of step S7 determines if the respective data is valid or invalid. If such determination is affirmative (or valid), processing proceeds to step S8 wherein the record address for recording the data into the image memory is calculated. After which, processing proceeds to step S9 wherein the image data is written in the image memory at the calculated address. Thereafter, processing proceeds step S10 wherein the counter is incremented.

If, however, the determination of step S7 is negative (or invalid), processing proceeds to step S10 wherein the counter is incremented.

Processing then proceeds to step S7 wherein a determination is made as to whether the entry of data is complete. If such determination is affirmative, the processing is completed. If, however, such determination is negative, processing returns to step S7. If the position of the data is outside the extracted area in step S7 (or invalid), processing proceeds to step S10 whereat the counter is incremented after which processing again proceeds to the determination step of S11.

As previously described, the apparatus of FIG. 7 may be utilized with a digital type electronic still camera. A description thereof will now be provided.

Figure 5A:
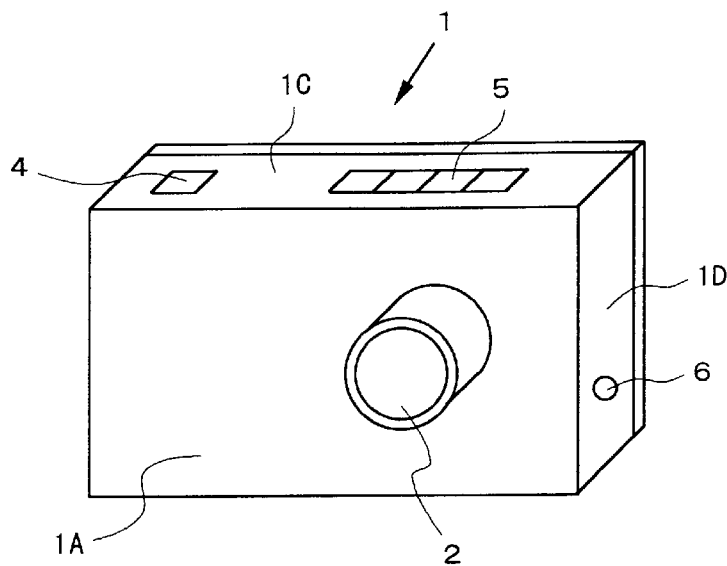
FIGS. 5A and 5B are perspective views of an electronic still camera according to an embodiment of the present invention.
Figure 5C:
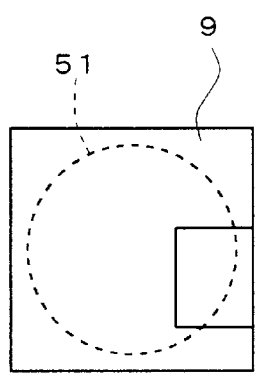
FIG. 5C is a diagram of a magneto-optical disk cartridge which may be used with the electronic still camera of FIGS. 5A and 5B.
Figure 5B:
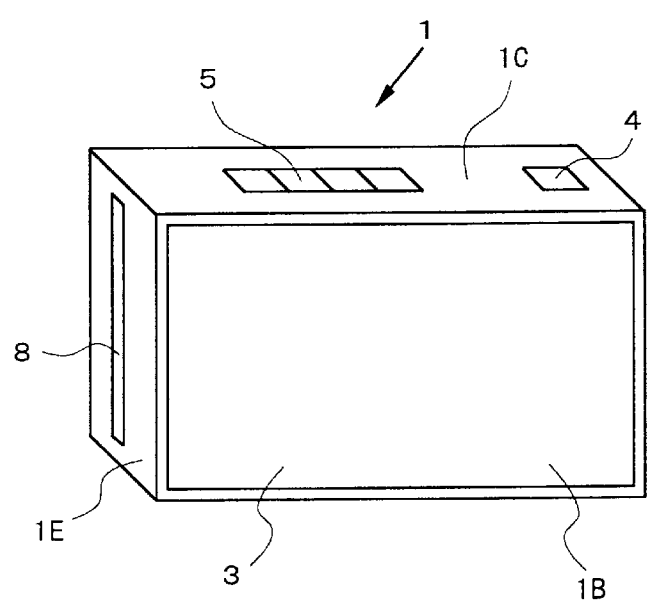

FIGS. 5A and 5B illustrate a digital type electronic still camera. Such electronic still camera is adapted to compress a digital still image video signal in accordance with a JPEG technique and to record the compressed signal on a magneto-optical disk which may be similar to a MD (minidisk) and to reproduce a recorded signal from such MD, as hereinafter more fully described.

PCT application No. JP95/01912 now WO 9609716 dated March 28, entitled "Still Picture System" is hereby incorporated by reference.

As shown in FIGS. 5A and 5B, the present electronic still camera includes a main camera body 1 having a front surface 1A, a back surface 1B, a top surface 1C and side surfaces 1D and 1E. A lens 2 is arranged on the front surface 1A. The lens 2 is adapted to receive an image or light rays from an object to be photographed. A liquid crystal display 3 is arranged on the back surface 1B. The liquid crystal display 3 is adapted to display an image to be photographed or a reproduced image. Such liquid crystal display 3 may be utilized as a view finder. A shutter switch 4 and other various switches 5 are arranged on the top surface 1C. A video output terminal 6 is arranged on the side surface 1D. A disk loading aperture 8 is arranged on the other side surface 1E. Such disk loading aperture 8 is adapted to receive a recording medium such as a cartridge 9 containing a magneto-optical disk 51 shown in FIG. 5C.

The magneto-optical disk/cartridge may be similar to a so-called mini-disk (MD) used to record musical or audio data. Such disk may record approximately 365 still pictures in JPEG-compressed form and approximately 40 minutes of audio information in a so-called ATRAC (Adaptive Transform Acoustic Coding) form. The magneto-optical disk 51 may have a diameter of approximately 64 mm. Additional details pertaining to the magneto-optical disk 51 are provided in PCT application No. JP95/01912, which has been incorporated by reference herein.

In operation, the lens 2 is oriented to a desired object when the electronic still camera is used to take a photograph. An image of such object is supplied through the lens 2 and is opto-electrically converted by a CCD photographic device 22 (FIG. 6) included in the main camera body 1 so as to form an image signal which is stored in the image memory 31 (FIG. 6) included in the main camera body and which is displayed on the liquid crystal display 3. When the shutter button 4 is activated or depressed, a still image corresponding to the image received through the lens 2 is recorded on the disk 51 in the cartridge 9.

A still image recorded on the magneto-optical disk 51 may be reproduced and displayed on the liquid crystal display 3. The still image recorded on the magneto-optical disk 51 may also be displayed on an external display screen, such as that of a television, if the video output terminal 6 of the main camera body 1 is coupled to a video input terminal of such television. Additionally, the still image recorded on the magneto-optical disk 51 may be retrieved or provided to a computer, such as a personal computer, and may be compiled therein with other data by utilizing an image compiling application program.

Therefore, a currently photographed image may be displayed on the liquid crystal display 3.

The present electronic still camera will now be more fully described with reference to FIG. 6.

The present electronic still camera generally includes the lens 2, the CCD device 22, a sample and hold and automatic gain control (AGC) circuit 32, an analog-to-digital (A/D) converter 33, a camera signal processing circuit 34, the memory controller 28, the image memory 31, a digital-to-analog (D/A) converter 35, a video signal processing circuit 36, a liquid crystal driving circuit 37, the liquid crystal display 3, a computer processing unit (CPU) 23, a ROM 25, a random access memory (RAM) 26, the image compressing/expanding circuit 27, input key(s) 29, an interface 30, and a magneto-optical disk drive circuit 21 which are connected as shown in FIG. 6. The magneto-optical disk drive circuit 21 generally includes a motor 52, an optical pick-up 53, a magnetic head 54, a servo circuit 55, a thread mechanism 56, an encoder 57, a driver 58, a RF circuit 59, a decoder 60, and an address decoder 61 which are connected as shown in FIG. 6.

The CPU 23 may control record/reproduce processing of the camera. For example, the CPU 23 may control the processing for recording video signals captured by the CCD photographic device 22 on the magneto-optical disk 51 in a compressed form, processing for expansion and reproduction of signals read from the magneto-optical disk 51, and so forth.

A CPU bus 23 connects the CPU 23, the ROM 25, the RAM 26, the image compression/expansion circuit 27, the memory controller 28, input keys 29, and the magneto-optical disk drive 21 through the interface 30.

The input keys 29 may enable an operator to input a desired command or function. One of the input keys 29 may be the shutter switch 4.

The ROM 25 and the RAM 26 may be utilized to store programs and/or information for use in the operation of the present camera.

The magneto-optical disk (or optical disk) 51 contained in a cartridge 9 may be loaded into the magneto-optical disk drive 21. A digital video signal compressed by a JPEG technique may be recorded on and reproduced from the magneto-optical disk 51. Data stored on the magneto-optical disk 51 may be accessed by use of respective addresses. Such addresses may be provided or recorded in accordance in a so-called Wobble format.

The magneto-optical disk 51 is rotated by the spindle motor 52. The optical pick-up 53 and the magnetic head 54 are arranged so as to be adjacent to the magneto-optical disk 51 and are adapted to move in a radial direction across the disk 51 by the thread mechanism 56. The servo circuit 55 receives a focus and tracking error signal from the RF circuit 59 and, in response thereto, generates a control signal(s) which is supplied to the spindle motor 52 and the thread mechanism 56. As a result, the spindle motor 52 and the thread mechanism 56 are controlled which, in turn provides focus and tracking control of a double-shaft or two-axes device of the optical pick-up 53.

As hereinafter more fully described, data to be recorded is supplied through the interface 30 to the encoder 57 so as to be processed or encoded in a predetermined manner. An encoded signal from the encoder 57 is supplied to the magnetic head 54 by way of the driver 58. As a result, a laser beam from the optical pick-up 53 and a modulated magnetic field from the magnetic head 54 are applied to the magnetic disk 51.

During reproduction, a laser beam from the optical pick-up 53 is irradiated onto the magneto-optical disk 51 and reflected light therefrom is supplied to the RF circuit 59, wherein a reproduced signal is obtained. Such reproduced signal is supplied to the decoder 60 and the address decoder 61. The address decoder decodes or detects the Wobble addresses and provides a output to the decoder 60. As a result, a decoded signal is formed and supplied from the decoder 60 to the interface 30.

The lens 2 is disposed in front of the CCD photographic device 22. During recording, light from an object to be photographed is supplied through the lens 2 and focused onto a light detecting plane of the CCD photographic device 22 so as to be photo-electrically converted to an image signal. Such image signal is supplied through the sample and hold and/or AGC circuit 32 to the A/D converter 33 so as to be converted into digital form. The digital image signal from the A/D converter 33 is supplied to the camera signal processing circuit 34 so as to form component video signals, such as a luminance signal Y and chromatic difference signals R-Y (Red—Y) and B-Y (Blue—Y).

The camera signal processing circuit 34 may also perform additional processing, such as that pertaining to gamma correction, aperture correction, shading processing, and so forth.

Under control of the memory controller 28, the video signal from the camera signal processing circuit 34 is supplied to the image memory 31 and then to the D/A converter 35 so as to be converted into analog form. An analog output signal from the D/A converter 35 is supplied to the video signal processing circuit 36. An output from the video signal processing circuit 36 may be supplied through the liquid crystal driver 37 to the liquid display 3. Such liquid display 3 may be used as a view finder during photographing. The video signal processing circuit 36 may also form a composite video signal from the received analog signal. Such composite signal may have a predetermined format, such as that corresponding to an NTSC (national television system committee) format. The composite signal may be outputted from an analog video signal output terminal 38.

When the shutter button 4 (FIG. 1) is pressed during recording, a video signal of an image may be supplied to the image memory 31. That is, the video signal supplied to the image memory 31 may be first supplied to the image compression/expansion circuit 27 by way of the CPU bus 27. The image compression/expansion circuit 27 is adapted to compress and expand a digital video signal in accordance with a JPEG technique, wherein such JPEG compression technique may involve DCT conversion and variable-length coding of the digital video signal. The compressed video signal from the image compression/expansion circuit 27 may be supplied by way of the controller 28 to the image memory 31.

The compressed video signal from the image compression/expansion circuit 27 may be further supplied to the encoder 57 of the magneto-optical disk drive 21 by way of the CPU bus 24 and interface 30. The encoder 57 is adapted to perform error correction coding, such as that in accordance with ACIRC (Advanced Cross Interleaved Reed Solomon Coding), and to modulate the received signal in accordance with a predetermined modulation technique, such as a so-called eight-to-fourteen modulation technique. An output of the encoder 57 is supplied through the driver 58 to the magnetic head 54. The optical pick-up 53 directs a laser beam onto the magneto-optical disk 51, and a magnetic field modulated by an output of the encoder 57 is applied to the magnetic head 54. As a result, a video signal in compressed form may be recorded on the magneto-optical disk 51.

During recording, the video signal stored in the image memory 31 is supplied to the D/A converter 35 and an output therefrom is supplied to the video signal processing circuit 36. An output of the video signal processing circuit 36 is supplied through the liquid crystal driver 37 to the liquid crystal display 3. As a result, the photographed image is displayed on the liquid crystal display 3.

During reproduction, an image to be reproduced is identified or designated by use of the input keys 29. Upon such designation, the optical pick-up 53 may be moved to the location or address corresponding to the designated recorded image, and compressed video signals representative of the designated image may be retrieved from the magneto-optical disk 51. In a manner similar to that previously described, such retrieved or reproduced signal is supplied to the decoder 60 by way of the RF amplifier 59 so as to be decoded or processed thereat. For example, such processing may involve data demodulation, error correction, and so forth. An output of the decoder 60 is supplied by way of the interface 30 and the CPU bus 24 to the image compression/ expansion circuit 27 wherein the JPEG-compressed video signal is expanded. Such expanded video signal may be stored in the image memory 31 under the control of the memory controller 28. The stored video signal from the image memory 31 is supplied to the D/A converter 35 so as to be converted into analog form which is supplied to the video signal processing circuit 36. An output of the video signal processing circuit 36 is supplied to the liquid crystal display 3 by way of the liquid crystal driver 37. The video signal processing circuit 36 may form a composite video signal having a predetermined or NTSC format. Such composite video signal may be outputted at the analog signal output terminal 38.

Therefore, during reproduction, the present apparatus may read out image data recorded on the magneto-optical disk 51, expand the data in the image compression/expansion circuit 27, and store it in the image memory 31 under the control of the memory controller 28. A desired part of the original image stored in the magneto-optical disk 51 may be extracted and processed so as to obtain a desired result, such as a positional change, an enlargement of the part, a reduction of the part, rotation of the part, modification of the part, or the like. To determine the position or location of the desired part for such an extraction operation, the number of clock pulses or data in the expanded form may be counted as previously described.

Thus, the present apparatus or electronic still camera counts the number of expanded data, calculates the position of data in the original image from the number of data, judges whether the position of the data is within the part of the original image to be extracted, and stores the data in the image memory only when the position of the data is within the part of the original image to be extracted. As a result, the present apparatus or camera does not require any additional memory other than the image memory to extract a portion of an original image.

Although in describing the present invention, the data recorded onto and reproduced from the recording medium 51 was described as being compressed in accordance with a JPEG technique, the present invention is not so limited. For example, such data may be processed or compressed in accordance with a different technique.

Although a preferred embodiment of the present invention and modifications thereof have been described in detail herein, it is to be understood that this invention is not limited to this embodiment and modifications, and that other modifications and variations may be affected by one skilled in the art without departing from the spirit and scope of the invention as defined by the appended claims.

What is claimed is:

1. A video apparatus comprising:
   image expanding means for expanding compressed image data;
   an image memory for storing expanded image data;
   counter means for counting a number of expanded image data transfers from the image expanding means;
   position computing means responsive to an output of said counter means for determining positions of the image data from the image expanding means;
   means for designating a part of the image data for display;
   means for comparing a respective position of the image data from the image expanding means with positions of image data within the part of the image data designated for display; and
   memory control means responsive to an output of the comparing means for controlling said image memory such that the expanded image data from said image expanding means is stored in said image memory when the image data is determined to be within the part designated for display and the expanded image data from said image expanding means is not stored in said image memory when the image data is not determined to be within the part desionated for display.

2. The video apparatus according to claim 1, wherein said memory control means controls said image memory such that the expanded image data from said image expanding means is enlarged or reduced scale only when the expanded image data is determined to be within the part designated for display.

3. A video memory controller for controlling a video memory so as to extract a part of an original picture, said controller comprising:
   means for dividing a compressed picture into a plurality of blocks of data;
   means for expanding each block of data to an original picture;
   counting means for counting each block address of the plurality of blocks;
   selecting means for selecting the part of the picture to be extracted;
   comparison means for comparing the address from the counting means and the address corresponding to the part selected by the selecting means; and
   controlling means for controlling a write operation of the video memory in accordance with the result of said comparison means such that expanded data from the expanding means is stored in said video memory when the data is within the part selected to be extracted and the expanded data from the expanding means is not stored in said video memory when the data is not within the part selected to be extracted.

4. A video memory controller according to claim 3, wherein the controlling means includes means for enlarging or decreasing the size of the extracted picture.

5. A video memory controller according to claim 3, wherein the compressed picture is compressed in accordance with a Joint Photographic Coding Expert Group (JPEG) technique.

6. A video memory controller for controlling a video memory so as to extract a part of an original picture, said controller comprising:
   a divider for dividing a compressed picture into a plurality of blocks of data;
   an expander for expanding each block of data to an original picture;
   a counter for counting each block address of the plurality of blocks;
   a selector for selecting the part of the picture to be extracted;
   a comparator for comparing the address from the counter and the address corresponding to the part selected by the selector; and
   a controller for controlling a write operation to the video memory in accordance with the result of the comparator such that expanded data from the expander is stored in said video memory when the expanded data is within the part selected to be extracted and the expanded data from the expander is not stored in said video memory when the expanded data is not within the part selected to be extracted.

7. Method for extracting a portion of an original picture, said method comprising the steps of:
   designating the portion of the original picture to be extracted;
   expanding data of a compressed picture to data of the original picture;
   counting addresses of the original picture;

comparing the addresses of the original picture and an address corresponding to the portion of the original picture designated to be extracted; and storing the extracted portion in a memory in accordance with the comparison result such that expanded data is stored in said memory when the expanded data is within the portion designated to be extracted and the expanded data is not stored in said memory when the expanded data is not within the portion designated to be extracted.

8. A method for extracting picture according to claim 7, further comprising the step of enlarging or decreasing the size of the extracted picture.

9. A method for extracting picture according to claim 7, wherein the compressed picture is compressed in accordance with a Joint Photographic Coding Experts Group (JPEG) technique.

10. An apparatus for extracting a portion of an image represented by image data recorded on a recording medium in a compressed form, said apparatus comprising:

image expanding means for expanding the compressed image data;

means for determining positions of the expanded image data;

means for designating the portion of the image to be extracted;

means for comparing a position of a respective expanded image data with image positions of the portion of the image designated to be extracted so as to determine if the respective expanded image data is within the designated portion; and image memory means for storing the respective expanded image data if the comparing means indicates that the position of the respective expanded image data is within the designated portion and for not storing the respective expanded image data if the comparing means fails to indicate that the position of the respective expanded image data is within the designated portion.

11. An apparatus for extracting a portion of an image represented by compressed image data, said apparatus comprising:

image expanding means for expanding the compressed image data so as to form a plurality of data samples and for outputting each of said data samples in response to a clock pulse;

means for counting the clock pulses so as to determine positions of said data samples;

means for designating the portion of the image to be extracted;

means for comparing a position of a respective data sample with the portion of the image designated to be extracted so as to determine if the respective data sample is within the designated portion; and image memory means, responsive to an output of the comparing means, for storing the respective data sample if the comparing means indicates that the position of the respective data sample is within the designated portion and for not storing the respective data sample if the comparing means fails to indicate that the position of the respective data sample is within the designated portion.

12. An electronic still camera apparatus for extracting a portion of an image represented by compressed image data, said apparatus comprising:

image expanding means for expanding the compressed image data so as to form a plurality of data samples and for outputting each of said data samples in response to a clock pulse;

means for designating the portion of the image to be extracted;

a memory controller having a write enable signal generating circuit including a counter for counting information associated with the clock pulses, a circuit for determining positions of said data samples based upon the counted clock pulses, and a circuit for comparing a position of a respective data sample with the portion of the image designated to be extracted so as to determine if the respective data sample is within the designated portion and if the position of the respective data sample is within the designated portion for generating a write enable signal, said memory controller further having an address generating circuit receiving an output from said write enable signal generating circuit and said clock pulses for determining address information; and an image memory for storing the data samples pertaining to the designated portion in response to the write enable signal and at addresses corresponding to the address information.

* * * * *